July 10, 1923.
F. H. MILLER
1,461,709
MACHINE FOR MAKING ICE CREAM CONES AND THE LIKE
Filed Dec. 27, 1915   5 Sheets-Sheet 4
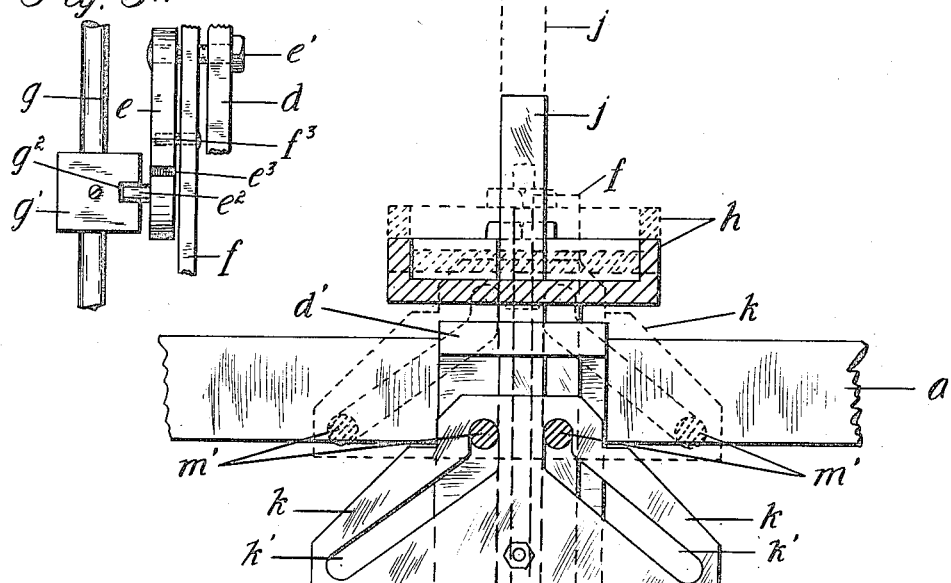
Fig. 5ª
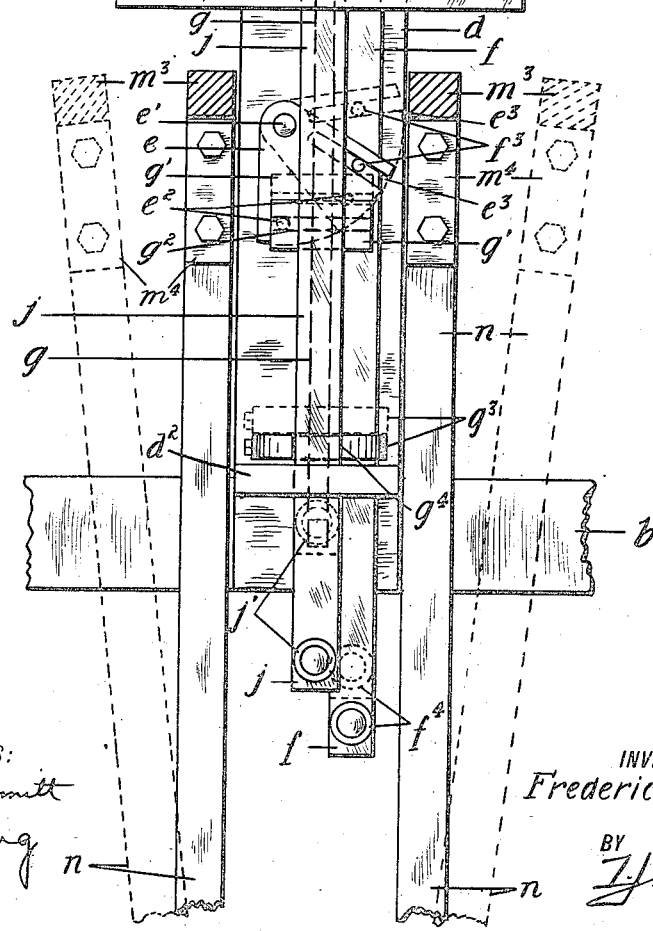
Fig. 5.
WITNESSES:
INVENTOR
Frederick H. Miller.
BY
ATTORNEY

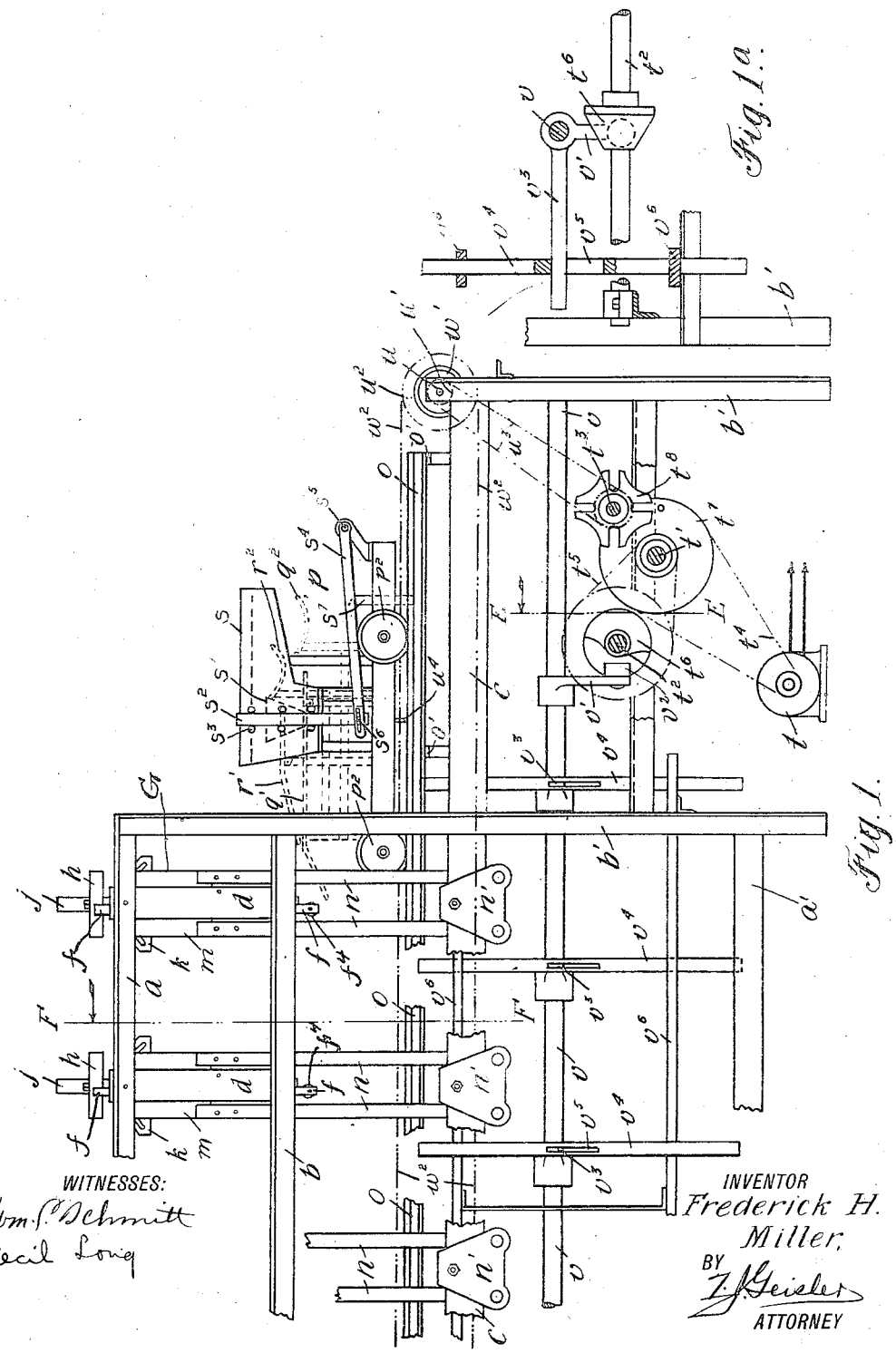

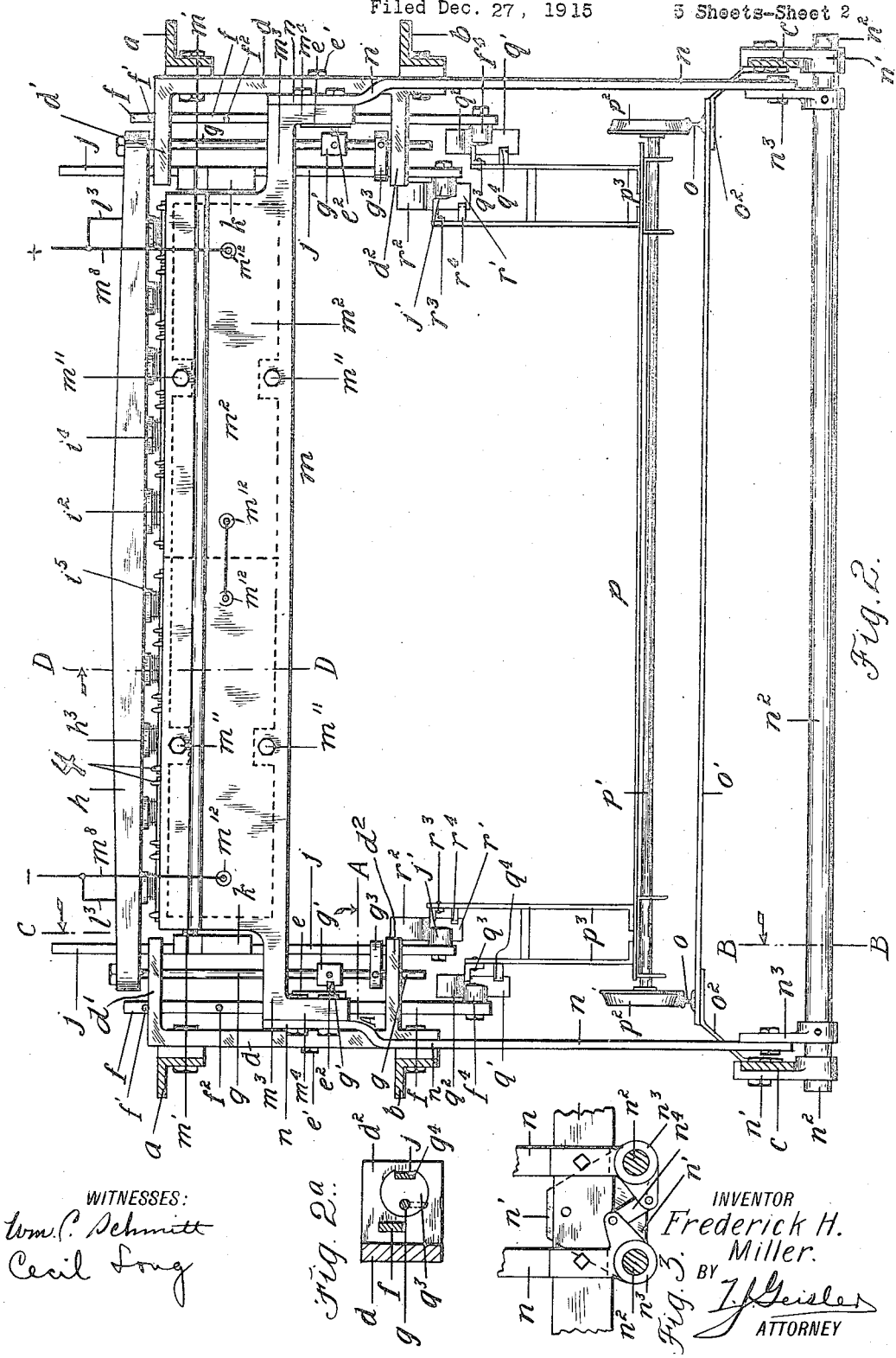

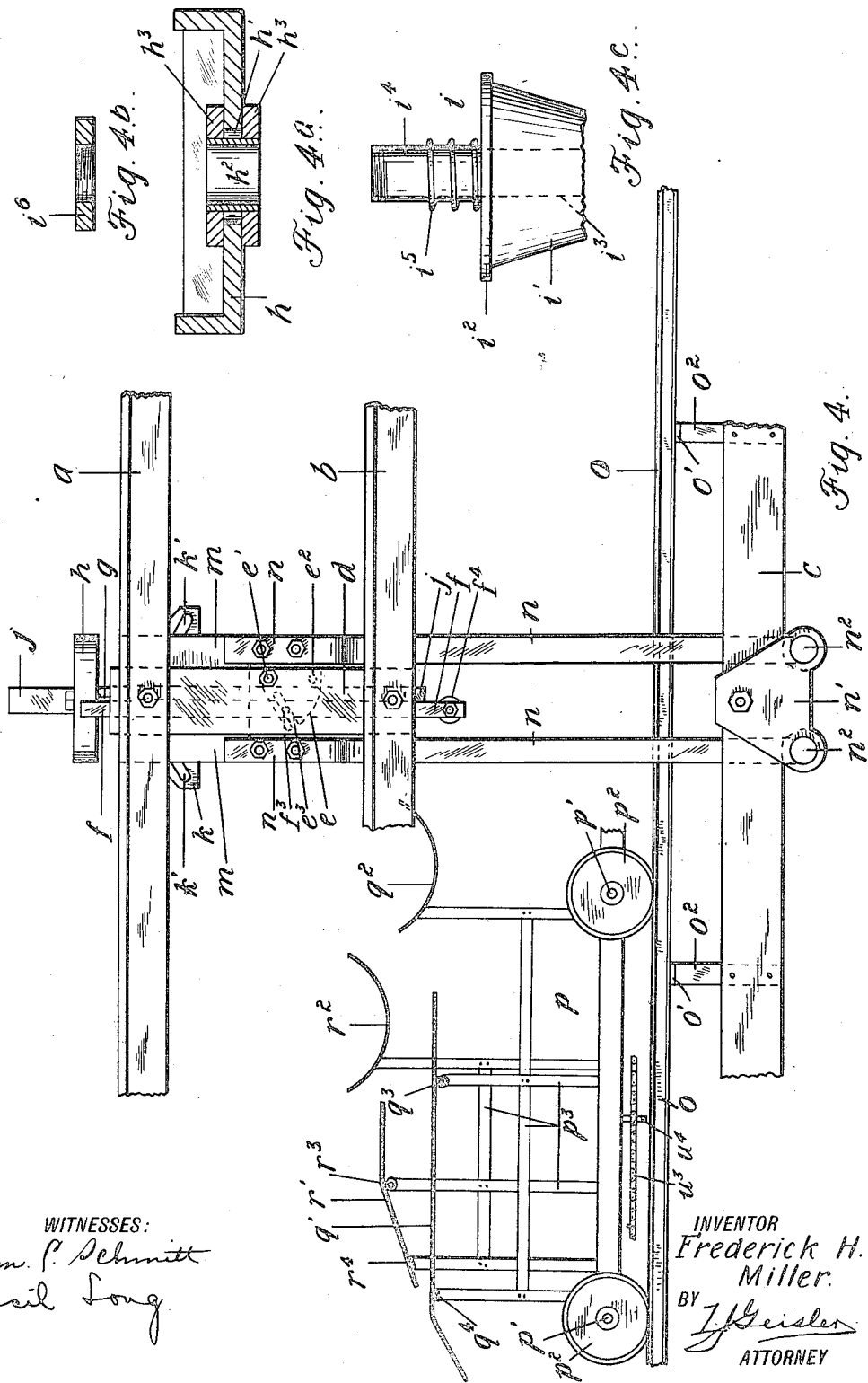

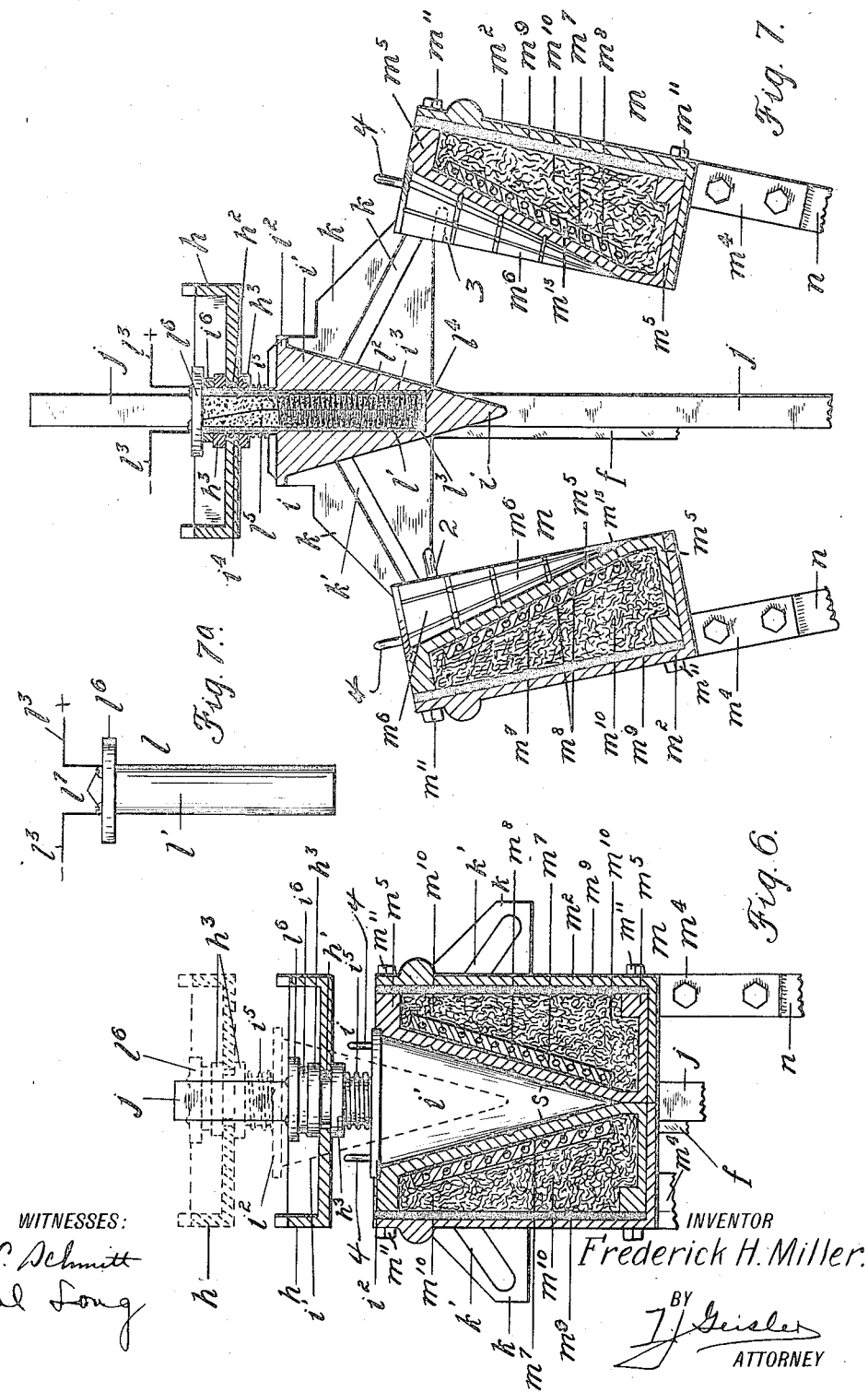

Patented July 10, 1923.

1,461,709

UNITED STATES PATENT OFFICE.

FREDERICK H. MILLER, OF PORTLAND, OREGON.

MACHINE FOR MAKING ICE-CREAM CONES AND THE LIKE.

Application filed December 27, 1915. Serial No. 68,910.

*To all whom it may concern:*

Be it known that I, FREDERICK H. MILLER, a citizen of the United States, and a resident of the city of Portland, county of Multnomah, State of Oregon, have invented a certain new and useful Improvement in Machines for Making Ice-Cream Cones and the like, of which the following is a specification.

This invention relates to automatic machinery used in the manufacture of ice-cream cones, demi-tasse cups, and other containers made of cake batter. The steps of such manufacture consist in placing the raw batter in baking ovens, baking the batter in the ovens, removing the baked containers from the ovens, and then recharging the ovens with raw batter and repeating the cycle of steps.

One of the main objects of my invention is to provide an improved machine for the manufacture of containers of the above mentioned type, which embodies, among others, the following features: a lower operating cost, a more convenient manner of operation, and a construction much simpler than the machines heretofore used. To this end, in my machine, the baking ovens are arranged in batteries so that the capacity of the machine may be increased or diminished by the addition or removal of one or more batteries of ovens. Furthermore, in order to bake a plurality of cones uniformly, I provide for the heating of these ovens by electricity. Further features of my invention consist in the arrangement of an automatic control by means of which all of the movements of the machine are perfectly timed in relation to each other.

In the accompanying drawings:

Fig. 1 is a diagrammatic side elevation of a portion of the machine, parts being broken away for the purpose of showing certain other parts, and certain cam elements being shown in dotted outline;

Fig. 1ª is a sectional detail of construction, taken approximately on the line E—E of Fig. 1, showing the automatic means for causing the batter-applying devices to be elevated;

Fig. 2 is a larger-scaled transverse section of the machine, taken approximately on the line F—F of Fig. 1, showing my improved baking oven and the means for operating the movable parts of same. In this view the batter-applying means are omitted from the carrier;

Fig. 2ª is a horizontal sectional view on the line A—A of Fig. 2, and shows a detail of construction;

Fig. 3 is a vertical section on the line B—B of Fig. 1, and shows another detail of construction;

Fig. 4 is a left end elevation of the parts shown in Fig. 1. In this view the carrier is shown moved to a position in advance of the oven;

Figs. 4ª, 4ᵇ and 4ᶜ are details of construction of the baking oven;

Fig. 5 is a larger-scaled fragmental, vertical section taken on the line C of Fig. 2; the broken lines of this view show the movements of the various parts of the oven;

Fig. 5ª is a larger-scaled detail of the locking devices shown on the right side of Fig. 1;

Fig. 6 is a larger-scale vertical section taken approximately on the line D—D of Fig. 2; this view shows the interior construction of the baking oven; the broken lines show the core lifted out of the molds before the latter are moved laterally from each other;

Fig. 7 is a view similar to that shown in Fig. 6, showing, however, the molds opened to permit the baked cone to drop out, and also to permit the recharging, with batter, of the core; and Fig. 7ª is an elevation of one of the core heating elements.

$a$, $a'$, $b$ and $c$ are longitudinal frame members of the machine, and $b'$ are vertical legs.

A plurality of baking ovens G are mounted transversely in the frame of the machine, said ovens being of identical construction and therefore only one will be described herein.

Bolted to the inner sides of the frame members $a$ $b$ are the vertical brackets $d$ (see Figs. 2, 2ª and 5) made with lateral frame members $d'$, $d^2$. A sector $e$ is pivoted on a stud bolt $e'$ on the inner side of each bracket. Said sector is made with an inwardly projecting stud pin $e^2$ and a slot $e^3$. A vertical slide rod $f$ is vertically reciprocable in the frame members $d'$, $d^2$ of the bracket $d$, the pins $f'$ $f^2$ limiting the degree of reciprocation. Said rod $f$ carries a stud pin $f^3$, which bears in the slot of the sector $e$, and on the lower end of the rod is a cam roller $f^4$. Also vertically reciprocable in the said frame members of each bracket $d$ is a cylindrical rod $g$. Said rod has fixed on it a block $g'$ in which is a horizontal slot $g^2$, adapted to act as a slideway for the stud pin $e^2$ of the sector $e$. Also fixed on the rod $g$ is a block $g^3$, made with a cut-out portion $g^4$ (see Fig. 2a). On the upper end of the rod $g$ is mounted one end of a cross beam $h$, in which the core elements $i$ are supported. A third rod $j$, also vertically reciprocable in the shelves $d'$ $d^2$, has on its lower end a cam roller $j'$. The rod $j$ is of square cross-section and bears in the cut-out portion $g^4$ of the block $g^3$. By this means the rod $g$ is held against rotation. The rod $j$ extends through a slot in the cross beam $h$, and has fixed on it at a point between the shelves $d'$ $d^2$ a cam plate $k$. The latter is made with two inclined slots $k'$ symmetrical with respect to a center line. Cam rollers $m'$ fixed on the ends of the pivoted oven mold sections $m$ bear in the slots $k'$. It is the vertical movement of the cam plate $k$ that opens and closes the oven molds.

The mold sections $m$ comprise aluminum matrices, backed by electric heating elements, the whole being suitably mounted in cast-iron cases $m^2$. Said cases have fixed on their ends the cam rollers $m'$. An integral part of the cases $m^2$ are the longitudinally projecting legs $m^3$, each having a transverse extension $m^4$, the latter forming a convenient means for bolting onto the radius arms $n$.

Directly beneath the center line of each oven, and bolted on to the frame members $c$ are the shaft supports $n'$. Said supports form bearings for two parallel rotatable shafts $n^2$. Bell cranks $n^3$ are fixed on these shafts $n^2$ and a link $n^4$ connects adjacent legs of these bell-cranks. The other legs are bolted to the radius arms $n$. The link connection $n^4$ insures a symmetrical accurate movement of the mold sections relative to each other. See Figs. 5 and 7.

Longitudinal rails, $o$, laid on cross-ties $o'$, which are supported by brackets, $o^2$, from the frame members $c$, form a trackway upon which a car $p$ is capable of having a periodic and intermittent longitudinal motion forward the length of the machine under the baking ovens of the latter. The car $p$ comprises the axles $p'$, wheels $p^2$, frame members $p^3$, and cams $q'$, $q^2$, $r'$, $r^2$. The cams $q'$ $q^2$ are in the same vertical plane with the cam roller $f^4$, and the cams $r'$ $r^2$ are in the same vertical plane with the cam rollers $j'$. The cams $q'$ $r'$ are pivoted at $q^3$ and $r^3$, respectively, their counter-clockwise rotation being limited by the stops $q^4$, $r^4$, while the cams $q^2$ $r^2$ are fixed in position. This car $p$ also carries a batter tank $s$ containing cake batter, with a dipper $s'$ therein adapted to be periodically lifted as the car is positioned under each oven so as to recharge the ovens with batter. The dipper $s'$ is provided with arms $s^2$ vertically movable between guide rolls $s^3$ on the ends of the tank. Lifting arms $s^4$, pivoted on a shaft $s^5$ at the rear of the car, have their forward ends slotted and said slots engage studs $s^6$ projecting from the arms $s^2$. The lifting arms $s^4$ are connected by a transverse member $s^7$ which projects down below the plane of the tops of the rails $o$, and which is adapted to be operated on by the automatic means which periodically act so as to elevate the dipper.

The cross beam $h$ which supports the core elements $i$ is made as follows: This beam is made in a channel form with the sides widened at their middle portion for purposes of re-inforcement. A series of holes $h'$ are made in the center line of the beam, and bushings $h^2$ are inserted in these holes. The bushings are of smaller diameter than the holes $h'$, which allow a certain amount of displacement, and collars $h^3$ of larger diameter than the holes prevent the bushings from falling out. The core elements $i$ (see Figs. 4c, 6 and 7) comprise an aluminum cone $i'$ made with a peripheral collar $i^2$. An axial bore $i^3$ is drilled in this cone for a portion of its length, and a piece of tubing $i^4$, having its upper end threaded and adapted to be inserted through the bushing $h^2$, is firmly fixed on said cone, the tubing $i^4$ and the bore $i^3$ being co-axial. In assembling, (see Figs. 4a, 4b, 4c) a compression coil-spring $i^5$ is slipped over the tubing $i^3$, the latter is then inserted through the bushing $h^2$, and a collar $i^6$ is screwed on the threaded end of the tubing. This arrangement compresses the spring $i^5$ so as to hold the cone relatively rigid, but at the same time allowing the cone to move axially against the expansive force of the spring $i^5$ when sufficient force is applied. The electric heating element 1, shown in Figs. 7, 7a, is then inserted in the bore of the tubing $i'$, and when a circuit is passed through said heating element the cone $i'$ will become heated. The heating element is made as follows: A piece of tubing $l'$ is lined with mica $l^2$, and a specially coiled resistance wire $l^3$ is inserted in said tubing. The lower end of the tubing is plugged up with an insulating medium $l^4$ and the tube is filled with insulating cement $l^5$ to prevent a possible short-circuiting between the coils of the wire. The asbestos board collar $l^6$ is cemented on the upper end of the tube $l'$ and the ends of the wire are made fast to the binding posts $l^7$. The heating elements of each oven are connected in series to the main circuit wires, the individual ovens being connected in multiple to said main circuit wires.

The mold sections $m$ contain the female die members of which the cones $i''$ are the male members. The aluminum sections $m^5$ have formed on their inner faces the filigreed halves $m^6$ of the female die members. The backs of these sections are recessed, and a sheet of mica $m^7$ placed against the face of same. Sheets of insulating cement $m^{12}$ in which the resistance wires $m^8$ are molded are pressed up against the mica $m^7$ and a piece of asbestos board $m^9$ closes the recessed portion. The open space is filled with asbestos fibre $m^{10}$. These sections are then placed in the cast-iron cases $m^2$, being bolted therein by the bolts $m^{11}$. The wires $m^8$ are brought out through the holes $m^{12}$ of the cases (see Fig. 1) and are connected in multiple with the main circuit wires. For convenience in casting, the aluminum sections are not made the entire width of the cases $m^2$, but are made in sections as indicated by the broken lines of Fig. 2.

Referring to Fig. 1, an electric motor $i$ furnishes the power required to operate the machine. Shafts $t'$, $t^2$ and $t^3$ are journaled transversely of the machine, the shaft $t'$ being driven directly from the motor by a driving connection $t^4$. The shaft $t^2$ is constantly driven from the shaft $t'$ by a driving connection $t^5$, and a cam $t^6$ is fixed on said shaft $t^2$. A pin gear $t^7$ is fixed on the shaft $t'$, and a companion slotted wheel $t^8$ is fixed on the shaft $t^3$. The latter is thus intermittently rotated a quarter revolution by the action of such gear.

A shaft $u$ is journaled transversely of the machine at the rear upper end thereof, and a sprocket wheel $u'$ is fixed thereon. A sprocket wheel $u^2$ is adapted to be engaged with the shaft $u$ by a clutch $w'$, and a chain drive $u^3$ connects the sprocket $u^2$ with a sprocket fixed on the shaft $t^3$, and forms the means for driving the shaft $u$ intermittently in synchronism with the shaft $t^3$. A chain $w^2$, running over the sprocket $u^2$, and an idler sprocket located at the other end of the machine (not shown herein) extends longitudinally the length of the machine. A projecting member $u^4$, fixed on the car $p$, is adapted to engage the chain $u^3$, and as the latter is moved the car will be progressively moved forward, being positioned for a short period under each of the successive baking ovens.

As the car passes under each oven the cams carried by the car will act as previously described to operate the ovens.

As the car is positioned beneath an oven, and the molds are opened, the dipper is automatically lifted up so as to recharge the cores. The means for lifting the dippers at the proper time consist of the following parts: A rock-shaft $v$ is journaled longitudinally of the machine, as shown in Figs. 1 and 1a. A cam-follower $v'$ is fixed on said shaft, the cam-roll $v^2$ of which bears on the cam $t^6$ and as the latter rotates the cam follower $v'$ and therewith the shaft $v$ will be periodically rocked.

Fixed on the shaft $v$ are a plurality of lever arms $v^3$. A corresponding plurality of vertical rods $v^4$ are provided with slots $v^5$, through which the lever arms $v^3$ project. The rods $v^4$ are supported in vertical position by the guide bars $v^6$, and as the shaft $v$ is rocked, the rods $v^4$ will all be lifted vertically. Whenever this action occurs and the car is located beneath any oven, the transverse member $s^7$ of the dipper lifting-arms $s^4$ will lie in the path of the corresponding rod $v^4$, and, as the latter is elevated, it will bear against the member $s^7$ and thereby raise the dipper arms $s^4$ and therewith the dipper $s'$, so as to recharge the cores with batter.

The general operation of the machine is as follows: As the car is moved forward toward the left, into position under any oven, having reference to Fig. 1, the cam $q'$ will first pass under the cam rollers $f^4$ and raise the latter. The consequent elevation of the rods $f$ and thereby the stud pins $f^3$ causes a partial rotation of the sectors $e$. This rotation of the sectors causes the stud pins $e^2$, carried by the latter, and which pins bears in the horizontal slots $g^2$ of the blocks $g'$, to raise the latter, thereby also raising the rods $j$ and the cross beam $h$, which carries the core elements $i$ to the position shown in the broken lines of Figs. 5 and 6. The movement in Fig. 6 is exaggerated for the purpose of clearness. The cone $s$ baked by the preceding action of the machine is shown in section in Fig. 6, and the lifting of the core element $i$ out of said baked cone leaves the latter entirely free to drop when the molds $m$ are opened.

It is to be noted that the cams $q'$ are of considerable length, and will therefore hold the cross beam $h$ in its elevated position for some time. As soon as the cams $q'$ have acted to raise the core elements out of the baked cones $s$, the cams $r'$ will contact with the cam rollers $j'$ thereby lifting the rod $j$ and the cam plates $k$. The elevation of said cam plates causes the cam rollers $m''$, carried by the molds $m$, to roll outward to the position shown in the broken lines of Fig. 5. This movement opens the molds by moving its sections apart and permits the baked cone to drop down onto a delivery apron (not shown).

As soon as the molds $m$ have been opened, the car will be brought to a stop, and during this interval the cores will be recharged with batter by the elevating of the rods $v^4$, as previously described. As soon as the dippers have been lowered to their initial position, the car will move forward, and as the cam $r'$ passes from under the cam roller $j'$ the cam $r^2$ passes over the same and forces it downward. This action closes the molds to their normal position. One of said mold sections is made with centering pins 2, and the other mold with a centering hole 3, adapted to receive said pin. This insures a return to exact-position. As soon as the molds $m$ have been closed, as shown in the full lines of Fig. 6, the cams $q'$ will pass under the cam rollers $f^4$. This permits the cross beam $h$ and thereby the core elements $i$ to drop downward by gravity. It is essential that the batter be uniformly spread about the cores when seated in the molds, since such condition will insure even baking of the latter. In order to assure such result it is necessary that the cores be centered in the molds. Such centering is effected by providing the tops of the female forms or mold sections $m^6$ with centering pins 4 (see Figs. 6 and 7) preferably rounded at the top. These pins 4 are so positioned relatively to the rims $i^2$ of the cores as to bear against such rims and thus hold the cores centrally in the mold sections when seated therein. The weight of the core elements $i$ and cross beam $h$ is sufficient to compress the batter $s$ on the cone $i'$ uniformly, but not sufficient to force it out of the form altogether.

It is to be noted that an interval elapses from the time that the core elements $i$ drop by gravity until the cam $q^2$ passes over the cam roller $f^4$ and forces down a trifle further the core elements $i$. This interval permits the batter to become slightly "set," so as to withstand the high pressure between the cones $i'$ and the female forms $m^6$. This last movement leaves all parts in the position shown in the full lines of Figs. 4, 5 and 6. Note that the final depression of the rod $f$ causes the sector to rotate to the point where the stud pin $e^2$ and the center of rotation of the sector are in a direct vertical line. In this way the rod $g$ will be locked against upward movement until the sector $e$ is rotated by the upward thrust of the rod $f$, the latter being caused by the passage of the cam $q'$ beneath the cam roller $f^4$ as previously described.

It has been found in practise that a certain amount of steam will be formed when the batter begins to bake. I have provided for the escape of this steam by using the compression springs $i^5$, which allow the core elements to raise slightly under the steam pressure, and after the latter has been exhausted, the springs will force the cone down firmly in its seat once more.

The passage of the car is so timed that the movements connected with the operation of the ovens will be identically periodic. As the car moves forward it will pass under the next baking oven where the action will be repeated. As the car moves back to initial position, the cams $q'$ and $r'$, being pivoted, will idle over the corresponding cam rolls $f^4$, $j'$, and the ovens will not be interfered with in any way. The means for bringing the car back to initial position are not described in this specification, but this may be accomplished by opening the motor switch, releasing a clutch $w'$, which engages the sprocket $u^2$ with the shaft $u$, and thereupon pushing the car back by hand.

I claim:

1. In a baking machine, an oven comprising a core and a divided mold, means for opening and closing the mold parts, a batter-applying element adapted to apply batter to the core between the separated mold parts when the mold is open, and means for operating said batter-applying element in time with the opening and closing of the mold.

2. In a baking machine, an oven comprising a substantially stationary core and a divided mold, means for opening and closing the mold parts, a batter-applying element adapted to apply the batter to the core between the separated mold parts when the mold is open, and means for operating said batter-applying element in time with the opening and closing of the mold.

3. In a baking machine, a substantially stationary core, a co-acting plural-part mold, means for moving the mold parts approximately laterally from and back to the core, a batter container, a batter-applying element, and means for moving such batter-applying element up and over the core and down and away therefrom again in time with the opening and closing of said mold.

4. In a baking machine, an oven comprising a core and a divided mold, a batter-carrier movable under the mold of the oven, means for opening and closing the mold parts in time with the movement of the carrier under the mold, automatic means for applying the batter to the core between the separated mold parts when the mold is open, such means operated in time with the movement of the batter-carrier.

5. In a baking machine, an oven comprising a core and a divided mold, a batter-carrier movable under the mold of the oven, means for opening and closing the mold parts in time with the movement of the carrier under the mold, automatic means in part carried by the batter-carrier for applying the batter to the core between the separated mold parts when the mold is open, such means operated in time with the movement of the batter-carrier.

6. In a baking machine, an oven comprising a core and a divided mold, a batter-carrier movable under the mold of the oven, means for automatically moving the batter-carrier, means for opening and closing the mold parts in time with the movement of the carrier under the mold, automatic means for applying the batter to the core between the separated mold parts when the mold is open, such means operated in time with the movement of the batter-carrier.

7. In a baking machine, an oven comprising a core and a divided mold, a batter-carrier movable under the mold of the oven, means for automatically moving the batter-carrier, means for opening and closing the mold parts in time with the movement of the carrier under the mold, automatic means in part carried by the batter-carrier for applying the batter to the core between the separated mold parts when the mold is open, such means operated in time with the movement of the batter-carrier.

8. A baking machine comprising a series of ovens each comprising a core and a divided mold, a batter carrier movable under the molds of ovens, means for opening and closing the molds in time with the movement of the batter-carrier to thereby discharge the baked product and permit batter to be applied to the core of an oven, and means for applying a body of batter to a core between the separated parts when the mold is open.

9. A baking machine comprising a series of ovens each comprising a core and a divided mold, a batter carrier movable under the molds of ovens, means for progressively moving the batter carrier, means for opening and closing the molds in time with the movement of the batter carrier to thereby discharge the baked product and permit batter to be applied to the core of an oven, and means for applying a body of batter to a core between the separated parts when the mold is open.

10. In a baking machine, a frame extending lengthwise, a plurality of batteries of ovens arranged transversely of the frame, each oven comprising a core and a mold made of laterally separable parts, a batter carrier movable lengthwise of the frame and under the batteries of the ovens, automatic means for moving the carrier, means for automatically opening and closing the ovens of a battery in time with the positioning of the carrier under such battery, and means for lifting a body of batter from the carrier to the cores in time with the opening of said molds.

11. In a baking machine the combination of an oven comprising a core and a mold, the latter consisting of plural parts laterally movable from the core; a batter-carrier movable under the oven; means for moving the batter carrier; a batter-applying element operating in conjunction with the batter-carrier; and means, co-operating with the movement of the batter-carrier, adapted first to lift the core slightly, then to move the mold parts apart, then to throw the batter applying element into action, then to move the mold parts together about the core, and then to seat the core in the mold.

12. In a baking machine the combination of an oven comprising a core and a mold, the latter consisting of plural parts laterally movable from the core; a batter-carrier movable under the oven; means for moving the batter-carrier; a batter-applying element operating in conjunction with the batter-carrier; means, co-operating with the movement of the batter-carrier, adapted first to lift the core slightly, then to move the mold parts apart, then to throw the batter-applying element into action, then to move the mold parts together about the core, and then to seat the core in the mold; and other means adapted normally yieldingly to hold the core in its mold but permitting it to be slightly moved out of the latter under undue pressure of gases generated in the oven in the baking process.

13. In a baking machine the combination of an oven comprising a core and a mold, the latter consisting of plural parts laterally movable from the core; a batter-carrier movable under the oven; a batter-applying element operating in conjunction with the batter-carrier; and means, co-operating with the movement of the batter-carrier, adapted first to lift the core slightly, then to move the mold parts apart, then to throw the batter applying element into action, then to move the mold parts together about the core, and then to seat the core in the mold.

14. In a baking machine the combination of an oven comprising a core and a mold, the latter consisting of plural parts laterally movable from the core; a batter-carrier movable under the oven; a batter-applying element operating in conjunction with the batter-carrier; means, cooperating with the movement of the batter-carrier, adapted first to lift the core slightly, then to move the mold parts apart, then to throw the batter applying element into action, then to move the mold parts together about the core, and then to seat the core in the mold; and other means adapted normally yieldingly to hold the core in its mold but permitting it to be slightly moved out of the latter under undue pressure of gases generated in the oven in the baking process.

15. In a baking machine, the combination of an oven comprising a core and a divided mold, a batter-applying element, means co-operating with the movement of the batter-applying element adapted first to lift the core slightly, then to move the mold parts apart, then to throw the batter-applying element into action, then to move the mold parts together about the core, and then to seat the core in the mold.

16. In a baking machine, the combination of an oven comprising a core and a divided mold, a batter-applying element, means co-operating with the movement of the batter-applying element adapted first to lift the core slightly, then to move the mold parts apart, then to throw the batter-applying element into action, then to move the mold parts together about the core, and then to seat the core in the mold, and means for centering the core in the mold when seated in the latter.

17. In a baking machine, the combination of an oven comprising a core and a divided mold, a batter-applying element, means co-operating with the movement of the batter-applying element adapted first to lift the core slightly, then to move the mold parts apart, then to throw the batter-applying element into action, then to move the mold parts together about the core, and then to seat the core in the mold, and other means adapted normally yieldingly to hold the core in its mold, but permitting it to be slightly moved out of the latter under undue pressure of the gases generated in the oven during the baking process, and means for centering the core in the mold when seated in the latter.

18. In a baking machine, an oven comprising a substantially stationary core and a mold made of laterally separable parts, and means for moving the mold parts away from, and bringing them together about the core.

19. In a baking machine, an oven comprising a core and a mold made of a plurality of laterally separable parts, means for heating the core and the parts of the mold simultaneously, a batter-carrier moving under the oven, means on the carrier operating for opening and closing the mold-parts in time with the passage of the carrier, and automatic means adapted to apply batter to the core when the mold is opened.

20. In a baking machine in combination with an oven comprising a core and an openable mold, means for periodically opening the latter, and a tank carriage holding the batter, of a device for applying material to the core when exposed, said device vertically slidable on the carriage; means on the carriage for lifting said device; and means for operating said lifting mechanism, said means timed to cause the lifting of the material applying device contemporaneously with the opening of the molds of the oven.

21. In a baking machine in combination with an oven comprising a core and an openable mold, means for periodically opening the latter, and a tank carriage holding the batter, of a device for applying material to the core when exposed, said device being vertically slidable on the carriage; a rocker arm on the carriage operable to lift and lower said device; and means for operating said rocker arm, said means timed to cause the lifting of the material applying device contemporaneously with the opening of the molds of the oven.

22. In a baking machine in combination with an oven comprising a core and an openable mold, means for periodically opening the latter, and a tank carriage holding the batter, of a dipper supported vertically slidable on the carriage; means on the carriage for lifting said dipper; and means for operating said lifting mechanism, said means timed to cause the lifting of the dipper contemporaneously with the opening of the molds of the oven.

23. In a baking machine in combination with an oven comprising a core and an openable mold, means for periodically opening the latter, and a tank carriage holding the batter, of a dipper supported vertically slidable on the carriage; a rocker arm on the carriage operable to lift and lower said dipper; and means for operating said rocker arm, said means timed to cause the lifting of the dipper contemporaneously with the opening of the molds of the oven.

24. A baking machine comprising an oven having a plurality of matrices each comprising a core and an openable mold; a carriage movable under the oven, said carriage bearing a tank for holding batter; automatic means, actuated by the movement of the carriage operating to open the molds; automatic means borne by the carriage operating to apply material to the core of the oven; and means for propelling the carriage adapted to progressively move the same under the matrices of the oven.

25. A baking machine comprising an oven having a plurality of matrices each comprising a core and an openable mold; a carriage movable under the oven, said carriage bearing a tank for holding batter; automatic means, actuated by the movement of the carriage, operating to open the molds; automatic means borne by the carriage operating to apply material to the core of the oven; means for propelling the carriage adapted to progressively move the same under the matrices of the oven; and automatic means for interrupting the driving of the carriage during the operation of the means for applying material to the core and causing the last mentioned means to remain at rest during the driving of the carriage.

26. A baking machine comprising an oven having a plurality of matrices each comprising a core and an openable mold; a carriage movable under the oven, said carriage bearing a tank for holding batter; automatic means, actuated by the movement of the carriage, operating to open the molds; automatic means borne by the carriage operating to apply material to the core of the oven;

means for propelling the carriage adapted to progressively move the same; and automatic means for holding the carriage for an interval at each station of the battery of ovens.

27. A baking machine comprising an oven having a plurality of matrices each comprising a core and an openable mold; a carriage movable under the oven, said carriage bearing a tank for holding batter, automatic means actuated by the movement of the carriage operating to open the molds; automatic means borne by the carriage operating to apply material to the core of the oven; means for propelling the carriage adapted to progressively move the same; automatic means for interrupting the driving of the carriage during the operation of the means for applying material to the core, and causing the last mentioned means to remain at rest during the driving of the carriage; and automatic means for holding the carriage for an interval at each station of the battery of ovens.

28. In a baking machine, an oven comprising a core and a divided mold, a batter-carrier movable adjacent the mold of the oven, means for automatically moving the batter-carrier, means for opening and closing the mold parts in time with the movement of the carrier, automatic means for applying the batter to the core between the separated mold parts when the mold is open, such means operated in time with the movement of the batter-carrier.

29. A baking machine comprising a series of ovens each comprising a core and a divided mold, a batter carrier movable under the molds of the ovens, automatic means for progressively moving the batter carrier, means for opening and closing the molds in time with the movement of the batter carrier to thereby discharge the baked product and permit batter to be applied to the core of an oven, and means for applying a body of batter to a core between the separated parts when the mold is open.

FREDERICK H. MILLER.